US012345582B2

(12) United States Patent
Lei et al.

(10) Patent No.: US 12,345,582 B2
(45) Date of Patent: Jul. 1, 2025

(54) NANO FILM COMPOSITE STRAIN SENSOR, PREPARATION METHOD THEREFOR AND USE THEREOF

(71) Applicant: Song Nuo Meng Technology Co., Ltd., Changsha (CN)

(72) Inventors: Weiwu Lei, Changsha (CN); Chengyi Xu, Changsha (CN); Jian Xu, Changsha (CN); Sufu Liu, Changsha (CN); Penghui Zeng, Changsha (CN)

(73) Assignee: Song Nuo Meng Technology Co., Ltd., Changsha (CN)

( * ) Notice: Subject to any disclaimer, the term of this patent is extended or adjusted under 35 U.S.C. 154(b) by 335 days.

(21) Appl. No.: 18/130,685

(22) Filed: Apr. 4, 2023

(65) Prior Publication Data

US 2023/0236077 A1    Jul. 27, 2023

(30) Foreign Application Priority Data

Oct. 11, 2022  (CN) .............................. 202211239996

(51) Int. Cl.
*G01L 1/22* (2006.01)
(52) U.S. Cl.
CPC ................... *G01L 1/2287* (2013.01)
(58) Field of Classification Search
CPC .... G01L 1/2287; G01L 5/0042; G01L 5/0028
See application file for complete search history.

(56) References Cited

U.S. PATENT DOCUMENTS

| 2015/0082898 | A1 | 3/2015 | Ohkoshi |
| 2017/0315013 | A1 | 11/2017 | Takemoto et al. |
| 2021/0063258 | A1 * | 3/2021 | Sato ...................... H05K 1/167 |
| 2021/0310883 | A1 | 10/2021 | Obata et al. |

FOREIGN PATENT DOCUMENTS

| CN | 114414123 A | * | 4/2022 | |
| CN | 116202663 A | * | 6/2023 | ............ B82Y 30/00 |
| EP | 3333558 A1 | * | 6/2018 | ............ B25J 13/084 |
| JP | 2019128183 A | * | 8/2019 | ............ C22C 38/40 |

* cited by examiner

*Primary Examiner* — Octavia Hollington
(74) *Attorney, Agent, or Firm* — Hemisphere Law, PLLC; Zhigang Ma

(57) ABSTRACT

The present invention discloses a nano film composite strain sensor, a preparation method therefor and a use thereof, and relates to the technical field of sensors. The sensor includes a substrate layer, where the surface of the substrate layer is provided with a transition layer; the surface of the transition layer is provided with an insulating layer; the partial surface of the insulating layer is provided with a strain layer; the remained partial surface of the insulating layer is provided with a protecting layer; the partial surface of the strain layer is provided with a pad; and the remained partial surface of the strain layer is provided with the protecting layer.

10 Claims, 3 Drawing Sheets

NANO FILM COMPOSITE STRAIN SENSOR, PREPARATION METHOD THEREFOR AND USE THEREOF

TECHNICAL FIELD

The present disclosure belongs to the technical field of sensors, and particularly relates to a nano film composite strain sensor, a preparation method therefor and a use thereof.

BACKGROUND

In the field of industry control, it is often needed to simultaneously measure multiple physical quantities (such as pressure, torque and stress). To simultaneously measure the above physical quantities in the relevant technology, a strain gage is adhered to an elastomer, so as to achieve the measurement of the above physical quantities. Adhesion is conducted generally by using a glue material; however, the glue material can be aged with change of ambient temperature and extension of use time; the aged glue material will affect the test precision and adhesion firmness of the strain gage; therefore, the error of the test is increased. Furthermore, in the relevant technology, one strain gage can only test one physical quantity; if multiple physical quantities are tested, multiple strain gages are simultaneously selected for combined use, thereby enlarging the occupied area of the strain gage; therefore, equipment with small volume cannot be tested.

Hence, the present disclosure provides a nano film composite strain sensor so as to solve the problems proposed in the above background art.

SUMMARY

The objective of the present disclosure is to provide a nano film composite strain sensor to solve at least one aspect of the problems and defects proposed in the above background art.

The present disclosure further provides a method for preparing the above nano film composite strain sensor.

The present disclosure further provides a use of the above nano film composite strain sensor.

Specifically, a first aspect of the present disclosure provides a nano film composite strain sensor, including:
  a substrate layer, the surface of which is provided with a transition layer;
  the surface of the transition layer being provided with an insulating layer;
  the partial surface of the insulating layer being provided with a strain layer;
  the remained partial surface of the insulating layer being provided with a protecting layer;
  the partial surface of the strain layer being provided with a pad;
  the remained partial surface of the strain layer being provided with the protecting layer;
  the substrate layer being a stainless steel layer;
  the transition layer including a niobium oxide layer;
  the strain layer consisting of a NiCrMnSi layer and a NiCrAlY layer;
  the NiCrMnSi layer being in contact with the insulating layer;
  the NiCrAlY layer being in contact with the protecting layer;
  the strain layer module being arranged as a torque measurement module, a stress measurement module and a pressure measurement module.

According to one of technical solutions of the sensor of the present disclosure, the present disclosure at least has the following beneficial effects:
  according to the present disclosure, the surface of the substrate layer is provided with the niobium oxide transition layer to relieve a stress caused by mismatching between the insulating layer and the substrate layer by utilizing niobium oxide, thereby improving the binding strength between the substrate layer and the insulating layer and promoting the stability and service life of the nano film composite strain sensor.

According to the present disclosure, the insulation of an electrochemical signal between the strain layer and the stainless steel layer is ensured by arrangement of the insulating layer.

In the present disclosure, the strain layer consists of the NiCrMnSi layer and the NiCrAlY layer, where the NiCrMnSi layer has a high density, few surface defects and a high binding strength to the insulating layer, thereby increasing the test precision of the strain layer; whereas the NiCrAlY layer contains metal aluminum, the metal aluminum can become aluminum oxide in the presence of oxygen, and aluminum oxide can take a certain antioxidant effect, which is conducive to promoting the antioxidant property of the strain sensitive layer.

In the present disclosure, the protecting layer protects the strain layer so as to promote the antioxidant property of the strain layer.

In the present disclosure, a plurality of test modules are arranged in the strain layer so that multiple sets of parameters are simultaneously measured by arranging the plurality of test modules.

according to some embodiments of the present disclosure, the test modules in the strain layer are distributed in a Mi-zi form.

According to some embodiments of the present disclosure, the number of the torque measurement modules is 4.

According to some embodiments of the present disclosure, the number of the pressure test modules is 2.

According to some embodiments of the present disclosure, the number of the stress test modules is 2.

According to some embodiments of the present disclosure, the torque test module divides the sensor into four parts uniformly.

According to some embodiments of the present disclosure, each of the pressure test modules is distributed between the two adjacent torque test modules.

According to some embodiments of the present disclosure, the distances between each of the pressure test modules and the two adjacent torque test modules are the same.

According to some embodiments of the present disclosure, each of the pressure test modules is symmetrically arranged.

According to some embodiments of the present disclosure, each of the stress test modules is distributed between the two adjacent torque test modules.

According to some embodiments of the present disclosure, the distances between each of the stress test modules and the two adjacent torque test modules are the same.

According to some embodiments of the present disclosure, each of the stress test modules is symmetrically arranged.

According to some embodiments of the present disclosure, the thickness of the stainless steel layer is 100 μm-800 μm.

According to some embodiments of the present disclosure, the thickness of the stainless steel layer is 100 μm-300 μm.

According to some embodiments of the present disclosure, the stainless steel layer is at least one of a 304 stainless steel layer, a 316L stainless steel layer, a 17-4 PH stainless steel layer, a 630 stainless steel layer and a 15-5 PH stainless steel layer.

According to some embodiments of the present disclosure, the transition layer further includes a NiCr layer; and the NiCr layer is in contact with the stainless steel layer.

The NiCr layer is arranged in the transition layer, which is beneficial to further increase the binding force between the NiCr layer and the stainless steel layer, thereby promoting the stability of the nano film composite sensor of the present disclosure and prolonging the service life of the nano film composite sensor.

According to some embodiments of the present disclosure, the thickness of the NiCr layer is 50 nm-100 nm.

According to some embodiments of the present disclosure, the thickness of the niobium oxide layer (niobium pentoxide layer) is 100 nm-800 nm.

According to some embodiments of the present disclosure, the thickness of the niobium oxide layer (niobium pentoxide layer) is 400 nm-600 nm.

This layer is too thin, leading to insufficient relieving of the stress, thereby affecting the stability of the sensor; this layer is too thick, leading to the increase in the thickness of the film layer in the sensor, thereby limiting the application scenarios of the sensor.

According to some embodiments of the present disclosure, the NiCrMnSi layer includes the following elements by mass percent:

50%-60% of Ni, 10%-30% of Cr, 20%-30% of Mn and 1%-10% of Si.

The amount of each component is controlled in the above range, which is conductive to further promoting the precision of the strain layer.

According to some embodiments of the present disclosure, the thickness of the NiCrMnSi layer is 100 nm-500 nm.

According to some embodiments of the present disclosure, the NiCrAlY layer includes the following elements by mass percent:

50%-60% of Ni, 10%-30% of Cr, 20%-30% of Al and 1%-10% of Y.

According to some embodiments of the present disclosure, the thickness of the NiCrAlY layer is 100 nm-800 nm.

According to some embodiments of the present disclosure, the thickness of the NiCrAlY layer is 600 nm-800 nm.

According to some embodiments of the present disclosure, the protecting layer is composed of an aluminum oxide layer and a silicon dioxide layer.

In the present disclosure, the protecting layer is a composite protecting layer. An oxygen ion permeation channel of a single protecting layer is obstructed by utilizing the interface barrier between layers, thereby enhancing the antioxidant ability of the protecting layer.

According to some embodiments of the present disclosure, the thickness of the aluminum oxide layer is 100 nm-300 nm.

According to some embodiments of the present disclosure, the thickness of the silicon dioxide layer is 200 nm-400 nm.

According to some embodiments of the present disclosure, the pad is a gold pad.

According to some embodiments of the present disclosure, the thickness of the pad is 500 nm-1500 nm.

A second aspect of the present disclosure provides a method for preparing the above nano film composite strain sensor, including the following steps of:

S1, successively growing a transition layer and an insulating layer on a substrate layer;

S2, growing a strain layer on the surface of the insulating layer; and patterning the strain layer after photolithography so as to form a patterned strain layer; and S3, growing a protecting layer on the surface of the partial region of the patterned strain layer; and growing a pad on the partial region of the surface of the patterned strain layer.

According to some embodiments of the present disclosure, the substrate layer needs grinding treatment.

According to some embodiments of the present disclosure, the grinding treatment is mechanical polishing.

According to some embodiments of the present disclosure, the transition layer is grown by magnetron sputtering or ion beam sputtering.

According to some embodiments of the present disclosure, the NiCr layer is grown by magnetron sputtering or ion beam sputtering.

According to some embodiments of the present disclosure, the niobium oxide layer is grown by magnetron sputtering or ion beam sputtering.

According to some embodiments of the present disclosure, the insulating layer is grown by magnetron sputtering or ion beam sputtering.

According to some embodiments of the present disclosure, the strain layer is grown by magnetron sputtering or ion beam sputtering.

According to some embodiments of the present disclosure, the NiCrMnSi layer is grown by magnetron sputtering or ion beam sputtering.

According to some embodiments of the present disclosure, the temperature of the substrate in the sputtering process of the NiCrMnSi layer is 300° C.-500° C.

According to some embodiments of the present disclosure, the sputtering power of the NiCrMnSi layer is 150 W-250 W.

According to some embodiments of the present disclosure, the NiCrAlY layer is grown by magnetron sputtering.

According to some embodiments of the present disclosure, the temperature of the substrate in the sputtering process of the NiCrAlY layer is 300° C.-500° C.

According to some embodiments of the present disclosure, the sputtering power of the NiCrAlY layer is 150 W-250 W.

A third aspect of the present disclosure provides a use of the above nano film composite strain sensor in measuring a pressure, a stress and/or a torque of an oil well bit.

According to some embodiments of the present disclosure, the nano film composite strain sensor is welded on the surface of the oil well bit.

BRIEF DESCRIPTION OF THE DRAWINGS

To facilitate the understanding of those skilled in the art, the present disclosure will be further explained in conjunction with accompanying drawings.

In the Figures:
100, torque test module; 101, stress test module; 102, pressure test module; 103, soldered dot; 104, oil well bit installing plane.
200, substrate layer; 201, NiCr layer; 202, Nb$_2$O$_5$ layer; 203, insulating layer; 204, NiCrMnSi layer; 205, NiCrAlY layer; 206, pad; 207, protecting layer.

DETAILED DESCRIPTION OF THE EMBODIMENTS

Next, the conception and the resulting technical effects will be clearly and completely described in conjunction with embodiments to sufficiently understand the purpose, features and effects of the present disclosure. Obviously, the described embodiments are only some embodiments of the present disclosure but not all the embodiments, and other embodiments obtained by those skilled in the art without creative efforts based on the embodiments of the present disclosure are all included within the protective scope of the present disclosure.

In the description of the present disclosure, the description of reference term "one embodiment", "some embodiments", "exemplary embodiments", "example", "specific example" or "some examples" or the like means that specific features, structures, materials or characteristics described in conjunction with this embodiment or example are included within at least one embodiment or example of the present disclosure. In this specification, the illustrative expressions of the above terms do not necessarily refer to the same embodiments or examples. Furthermore, the described specific features, structures, materials or characteristics can be combined in appropriate manners in any one or more embodiments or examples.

If the specific conditions are not specified in the embodiment, the conventional conditions or the conditions recommended by the manufacturer shall be followed. The used reagents or instruments that are not identified as manufacturers are conventional products that can be purchased on the market.

Example 1

Figure 1:
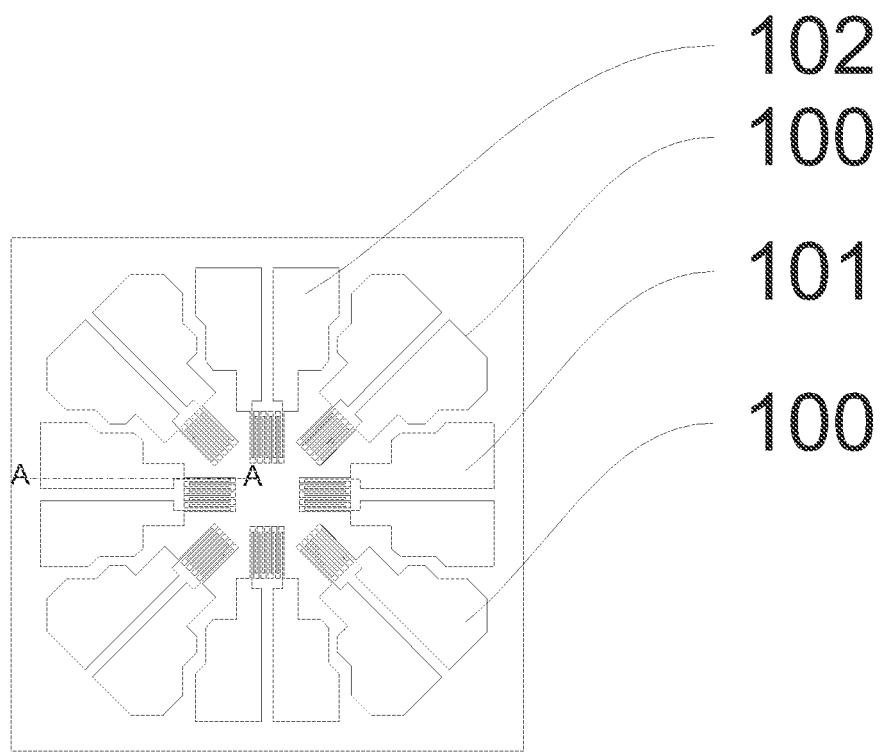
FIG. 1 is a top view of a structure of a nano film composite strain sensor in example 1 of the present disclosure.
Figure 2:
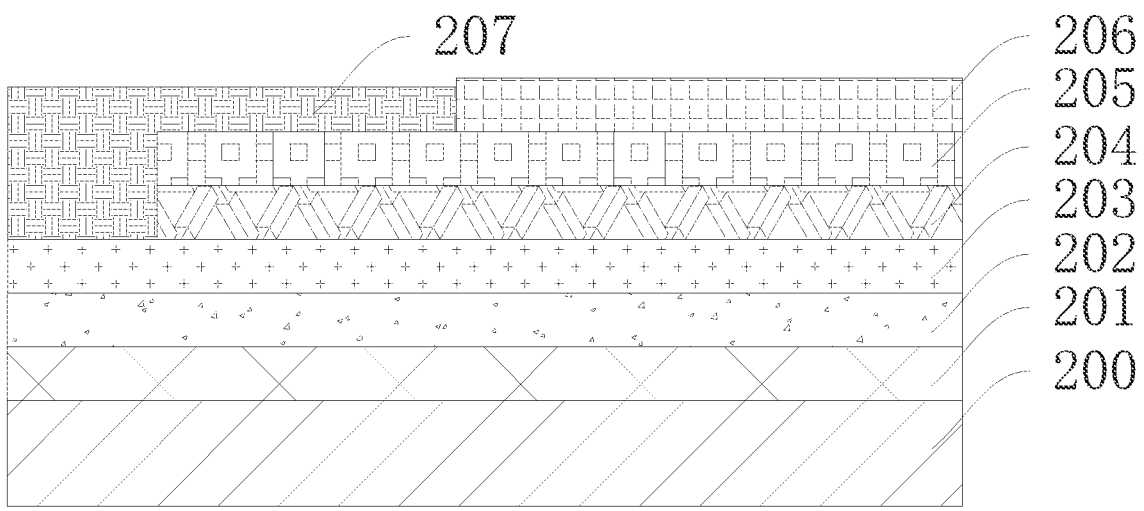
FIG. 2 is a cross-sectional view of a structure of a nano film composite strain sensor taken from an AA cross-section position in FIG. 1.

This example relates to a nano film composite strain sensor, the structure of which is as shown in FIG. 1-FIG. 2.

In this example, the nano film composite strain sensor is as shown in FIG. 1, in which eight test modules are distributed in a Mi-zi form;

two test modules distributed in a horizontal position of Mi-zi form are stress test modules 101;

two test modules distributed in a vertical position of Mi-zi form are pressure test modules 102;

The remained four test modules are torque test modules 100.

The cross-sectional diagram taken from AA position in FIG. 1 is as shown in FIG. 2 (the center of the Mi-zi form is the left side of FIG. 2). It can be seen from FIG. 2 that:

The nano film composite strain sensor in this example is composed of the following layers:

a substrate layer 200 (stainless steel layer (304 stainless steel layer), with a thickness of 100 μm), an NiCr layer 201 (with a thickness of 100 nm), Nb$_2$O layer 202 (with a thickness of 500 nm) and an insulating layer 203 (a silicon dioxide layer with a thickness of 2500 nm);

the partial region of the surface of the insulating layer 203 is provided with a NiCrMnSi layer 204 (with a thickness of 300 nm), a NiCrAlY layer 205 (with a thickness of 700 nm);

the remained partial region of the surface of the insulating layer 203 is provided with a protecting layer 207;

the partial region of the surface of the NiCrAlY layer is provided with a pad 206 (a Au layer with a thickness of 1000 nm);

the partial region of the surface of the NiCrAlY layer is provided with the protecting layer 207;

the protecting layer 207 is composed of an aluminum oxide layer (with a thickness of 200 nm) and a silicon dioxide layer (with a thickness of 300 nm) in sequence;

the aluminum oxide layer is in contact with the NiCrAlY layer.

The NiCrMnSi layer includes the following elements by mass percent:

55% of Ni, 20% of Cr, 20% of Mn and 5% of Si.

The NiCrAlY layer comprises the following elements by mass percent:

50% of Ni, 25% of Cr, 20% of Al and 5% of

A method for preparing the nano film composite strain sensor in this example includes the following steps:

S1, a stainless steel layer was flattened by grinding and polishing.

S2, a NiCr layer, a Nb$_2$O$_5$ layer and an insulating layer were successively deposited on the stainless steel elastic substrate treated in step S1 by using a magnetron sputtering coating method to fabricate a first preform.

S3, a NiCrMnSi layer and a NiCrMnSi layer were successively deposited on the surface of the first preform fabricated in step S2 by using the magnetron sputtering coating method to fabricate a second preform;

where the temperature of the substrate in the sputtering process of the NiCrMnSi layer was 450° C.;

the sputtering power of the NiCrMnSi layer was 200 W;

the temperature of the substrate in the sputtering process of the NiCrAlY layer was 450° C.

the sputtering power of the NiCrAlY layer was 200 W.

S4, eight test modules were machined by utilizing a photolithography technology, and then a pad was deposited on the surface of the second preform in step S3 by magnetron sputtering to fabricate a third preform.

S5, a protecting layer pattern was machined by utilizing the photolithography technology, and the protecting layer was deposited by utilizing a magnetron sputtering deposition technology.

Example 2

This example relates to a nano film composite strain sensor, which is different from example 1 in that a NiCr layer is not arranged in this example.

Comparative Example 1

This comparative example relates to a nano film composite strain sensor, which is different from example 2 in that a Nb$_2$O$_5$ layer is not arranged in this comparative example.

Comparative Example 2

This comparative example relates to a nano film composite strain sensor, which is different from example 2 in that a NiCrMnSi layer is not arranged in this comparative example.

Comparative Example 3

This comparative example relates to a nano film composite strain sensor, which is different from example 2 in that a NiCrAlY layer is not arranged in this comparative example.

Comparative Example 4

This comparative example relates to a nano film composite strain sensor, which is different from example 2 in that in this comparative, the NiCrAlY layer is replaced with the NiCrMnSi layer, i.e., the thickness of the NiCrMnSi layer is 1 μm.

Figure 3:
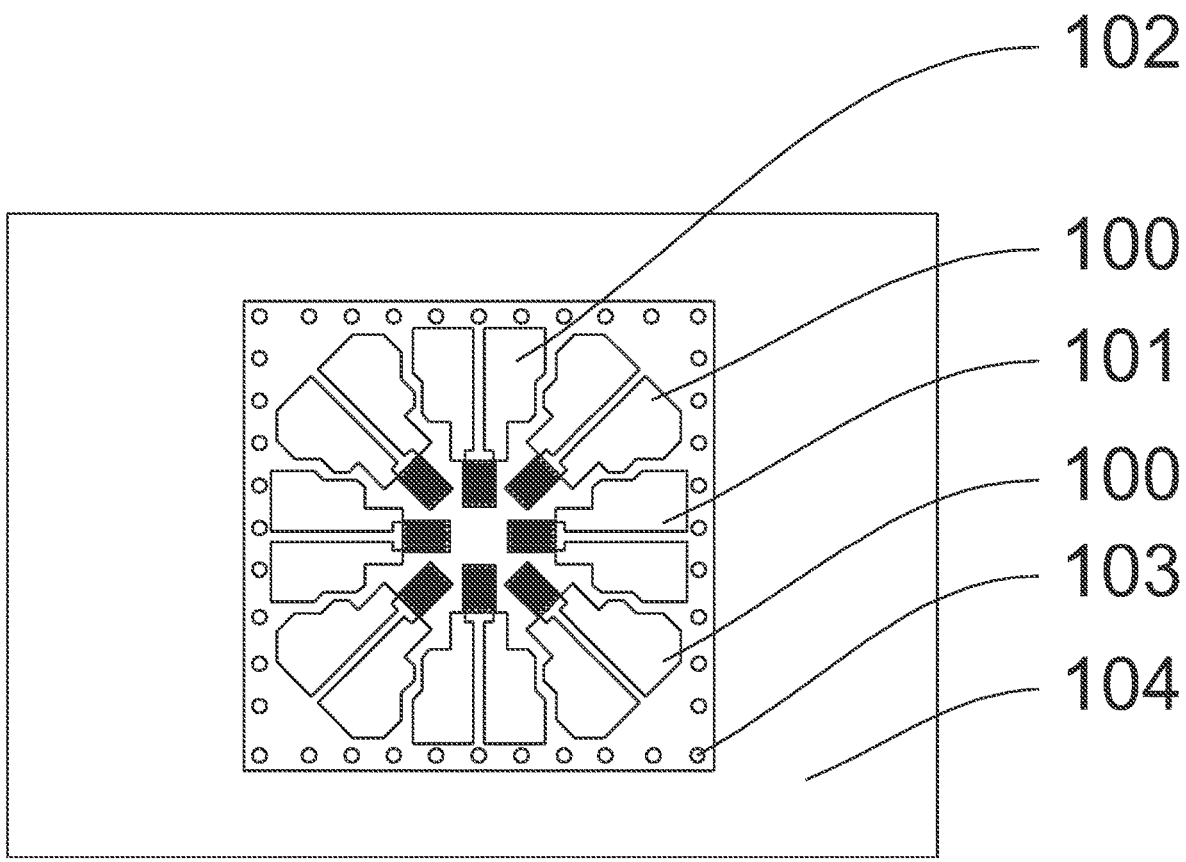
FIG. 3 is a structural diagram of a nano film composite strain sensor in example 1 of the present disclosure after installation.

The nano film composite sensors in examples 1-2 and comparative examples 1~4 are applied to an oil well bit, and the specific operations are as follows:
- S1, an oil well bit installation plane 104 was polished by using carborundum paper;
- S2, a nano film composite sensor was positioned on the oil well bit installation plane 104 in step S1;
- S3, spot welding equipment was used to align the four corners of the nano film composite sensor for spot welding positioning;
- S4, the edges of the positioned nano film composite sensor were inwardly moved by 1 mm for tight spot welding (the distribution of soldered dots 103 is shown in FIG. 3), so as to firmly weld the nano film composite sensor on the surface of the measured object.

Performance test results of the nano film composite sensors in examples 1-2 and comparative examples 1~4 of the present disclosure are seen in Table 1, and rest standard refers to GBT 13992-2010.

TABLE 1

Performance test results of nano film composite sensors in examples 1-2 and comparative examples 1-4 of the present disclosure

| — | Sensitivity coefficient | Fatigue life (times) |
|---|---|---|
| Example 1 | ±0.03% | $2.5 \times 10^7$ |
| Example 2 | ±0.05% | $2.1 \times 10^7$ |
| Comparative example 1 | ±1% | $1.3 \times 10^6$ |
| Comparative example 2 | ±2.1% | $5.6 \times 10^6$ |
| Comparative example 3 | ±3.5% | $6.8 \times 10^6$ |
| Comparative example 4 | ±5.5% | $5.8 \times 10^6$ |

It can be from the above results that the sensor of the present disclosure has high sensitivity (which is suitable for severe environment) and long service life.

In summary, in the nano film composite strain sensor of the present disclosure, the niobium oxide transition layer is arranged on the surface of the substrate layer to relieve the stress caused by mismatching between the insulating layer and the substrate layer by utilizing niobium oxide, thereby improving the binding strength of the substrate layer and the insulating layer and promoting the stability and service life of the nano film composite strain sensor. According to the present disclosure, the insulation of an electrochemical signal between the strain layer and the stainless steel layer is ensured through arrangement of the insulating layer. In the present disclosure, the strain layer is composed of the NiCrMnSi layer and the NiCrAlY layer, where the NiCrMnSi layer has a high density, few surface defects and a high binding strength to the insulating layer, thereby increasing the test precision of the strain layer; whereas the NiCrAlY layer contains metal aluminum which can become aluminum oxide in the presence of oxygen, and aluminum oxide can take a certain antioxidant effect, which is conducive to promoting the antioxidant property of the strain sensitive layer. In the present disclosure, the protecting layer protects the strain layer to promote the antioxidant property of the strain layer. In the present disclosure, the plurality of test modules are arranged in the strain layer so that the multiple sets of parameters can be simultaneously measured by arrangement of the plurality of test modules.

The above specific examples are intended to further describe the purpose, technical solution and beneficial effects of the present disclosure in detail. It should be understood that the above descriptions are specific examples of the present disclosure, but are not used for limiting the present disclosure. Any modifications, equivalent replacements and improvements made within the spirit and principle of the present disclosure are all included within the protective scope of the present disclosure.

What is claimed is:

1. A nano film composite strain sensor, comprising:
   a substrate layer, a surface of which is provided with a transition layer;
   the surface of the transition layer being provided with an insulating layer;
   a partial surface of the insulating layer being provided with a strain layer;
   a remained partial surface of the insulating layer being provided with a protecting layer;
   the partial surface of the strain layer being provided with a pad;
   the remained partial surface of the strain layer being provided with the protecting layer;
   the substrate layer being a stainless steel layer;
   the transition layer comprising a niobium oxide layer;
   the strain layer consisting of a NiCrMnSi layer and a NiCrAlY layer;
   the NiCrMnSi layer being in contact with the insulating layer;
   the NiCrAlY layer being in contact with the protecting layer; and
   a strain layer module being arranged as a torque measurement module, a stress measurement module and a pressure measurement module.

2. The nano film composite strain sensor according to claim 1, wherein the transition layer further comprises a NiCr layer; and the NiCr layer is in contact with the stainless steel layer.

3. The nano film composite strain sensor according to claim 1, wherein a thickness of the niobium oxide layer is 100 nm-800 nm.

4. The nano film composite strain sensor according to claim 1, wherein the NiCrMnSi layer comprises the following elements by mass percent:
   50%-60% of Ni, 10%-30% of Cr, 20%-30% of Mn and 1%-10% of S1.

5. The nano film composite strain sensor according to claim 1, wherein a thickness of the NiCrMnSi layer is 100 nm-500 nm.

6. The nano film composite strain sensor according to claim 1, wherein a thickness of the NiCrAlY layer is 100 nm-800 nm.

7. The nano film composite strain sensor according to claim 1, wherein the protecting layer is composed of an aluminum oxide layer and a silicon dioxide layer.

8. A method for preparing the nano film composite strain sensor according to claim 1, comprising the following steps of:
- S1, successively growing a transition layer and an insulating layer on a substrate layer;
- S2, growing a strain layer on the surface of the insulating layer; and patterning a strain layer after photolithography so as to form a patterned strain layer; and
- S3, growing a protecting layer on a partial region of a surface of the patterned strain layer; and growing a pad on the partial region of the surface of the patterned strain layer.

9. A use of the nano film composite strain sensor according to claim 1 in measuring a pressure, a stress and/or a torque of an oil well bit.

10. The use according to claim 9, wherein the nano film composite strain sensor is welded onto a surface of the oil well bit.

\* \* \* \* \*